United States Patent [19]

Lanser et al.

[11] Patent Number: 4,828,313

[45] Date of Patent: May 9, 1989

[54] VISOR CONTROL

[75] Inventors: Michael L. Lanser, Holland; Thomas C. VandenBerge, Jenison, both of Mich.

[73] Assignee: Prince Corporation, Holland, Mich.

[21] Appl. No.: 115,400

[22] Filed: Nov. 2, 1987

[51] Int. Cl.⁴ .............................................. B60J 3/02
[52] U.S. Cl. ................................ 296/97.12; 296/97.1
[58] Field of Search ................ 296/97 K, 97 H, 97 R, 296/97 B; 160/DIG. 3

[56] References Cited

U.S. PATENT DOCUMENTS

| | | |
|---|---|---|
| 2,223,845 | 2/1940 | Davies . |
| 3,035,864 | 5/1962 | Davidson .......................... 296/97 K |
| 3,910,627 | 10/1975 | Meyer . |
| 4,070,054 | 1/1978 | Cziptschirsch . |
| 4,352,518 | 10/1982 | Prince et al. . |
| 4,390,202 | 6/1983 | Flowerday et al. . |
| 4,394,043 | 7/1983 | Moulding et al. . |
| 4,428,612 | 1/1984 | Viertel et al. . |
| 4,469,367 | 9/1984 | Kuttler et al. . |
| 4,500,131 | 2/1985 | Fleming .......................... 296/97 K |
| 4,617,699 | 10/1986 | Nakamura ...................... 296/97 K |
| 4,666,205 | 5/1987 | Nakagawa ...................... 296/97 K |

FOREIGN PATENT DOCUMENTS

| | | |
|---|---|---|
| 467710 | 8/1950 | Canada . |
| 3002124 | 7/1981 | Fed. Rep. of Germany . |
| 3021984 | 12/1981 | Fed. Rep. of Germany . |
| 3103738 | 8/1982 | Fed. Rep. of Germany . |
| 1354485 | 5/1974 | United Kingdom ............. 296/97 K |
| 1452220 | 10/1976 | United Kingdom . |

Primary Examiner—Robert B. Reeves
Assistant Examiner—Brian Sells
Attorney, Agent, or Firm—Price, Heneveld, Cooper, DeWitt & Litton

[57] ABSTRACT

A visor control comprises a U-shaped spring clamp with inwardly converging sides terminating in inwardly projecting rounded tips which circumscribe a portion of the visor rod in all positions of adjustment. The sides of the clamp include alternately staggered slots which cooperate with alternately staggered lobes and flats disposed along the longitudinal axis of the visor pivot rod for selectively camming the visor into a snap-up raised stored position and spreading the sides to frictionally hold the visor rod therebetween when the visor is lowered to a use position. A tang extends from a portion of at least one of the sides of the U-shaped clamp and extends into a recess in the body of the visor to hold the clamp against rotation.

15 Claims, 2 Drawing Sheets

VISOR CONTROL

BACKGROUND OF THE PRESENT INVENTION

The present invention relates to a visor assembly and particularly to a control for releasably holding a visor in a stored position.

Visor assemblies for use in vehicles such as automobiles, typically use some form of a friction mechanism between a pivot rod mounting the visor to the vehicle roof and the visor body to allow the visor to be lowered from the roof and adjusted to a desired lowered position rotated about the visor rod and held in position for use. The mechanism must permit relatively easy adjustment of the visor and yet hold the visor in a desired position. U.S. Pat. No. 4,500,131 discloses a visor control which utilizes a U-shaped clamp with upwardly turned end walls having apertures formed therein for holding the clamp onto a visor rod and for providing the desired control. This clamp has been extensively used in vehicle visors and includes a detent position for raising and holding the visor in a snap-up stored position against the vehicle headliner and when the visor is lowered frictionally, holds the visor with respect to the pivot rod in a selected lowered use position.

SUMMARY OF THE PRESENT INVENTION

The visor torque control of the present invention utilizes a U-shaped spring clamp of improved construction eliminating the end walls of prior art devices, thereby reducing the material and manufacturing costs as well as facilitating the assembly of visors using the visor control. This is accomplished by providing a generally U-shaped clamp with inwardly converging sides terminating in inwardly projecting rounded tips which circumscribe a portion of the visor rod in all positions of adjustment. The sides of the clamp include alternately staggered slots which cooperate with alternately staggered lobes and flats disposed along the longitudinal axis of the visor pivot rod for selectively camming the visor into a snap-up raised stored position and spreading the sides to frictionally hold the visor rod therebetween when the visor is lowered to a use position. The visor and control of the present invention also includes means extending from a portion of at least one of the sides of the U-shaped clamp and cooperating with means in the visor body for locking the clamp against rotation.

The resultant visor and control provides relative ease of installation, reduces cost and provides the desired control of the visor between a releasably held snap-up stored position against a vehicle roof and selected lowered use positions. These and other features, objects and advantages of the present invention will become apparent upon reading the following description thereof together with reference to the accompanying drawings in which:

DETAILED DESCRIPTION OF THE PREFERRED EMBODIMENT

Figure 1:
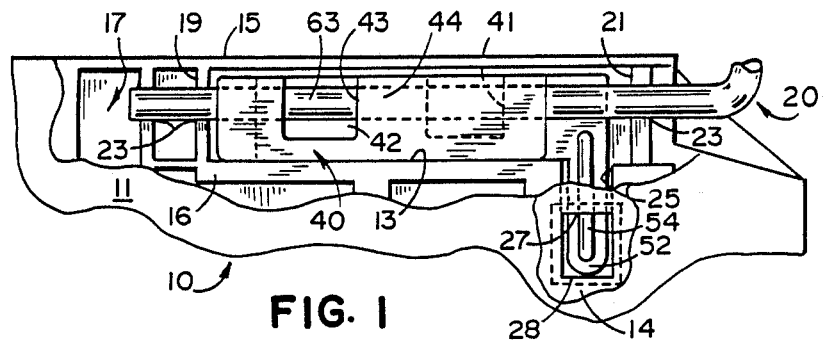
FIG. 1 is a fragmentary rear elevational view partly broken away of the driver's side visor viewed in a lowered use position from the windshield side of the vehicle.

Referring initially to FIG. 1 there is shown a visor 10 which is mounted to a vehicle to be movable between a raised stored position adjacent a vehicle roof or headliner 12 (shown schematically in FIG. 7) and a lowered use position as illustrated in FIG. 1. In FIG. 1 the view is from the windshield side of the driver side visor and the visor is broken away in multiple layers to show the visor core 17 having a clam shell-type construction shown also in FIG. 9. Core 17 includes a first core half 14 which is pivotally and integrally molded to a second core half 16 joined along the top edge 15 defining a hinge between the two core halves. Core 17 including halves 14 and 16 is molded of polypropylene and folded over to captively receive the visor control 40 of the present invention into which the visor pivot rod 20 is mounted.

Figure 9:
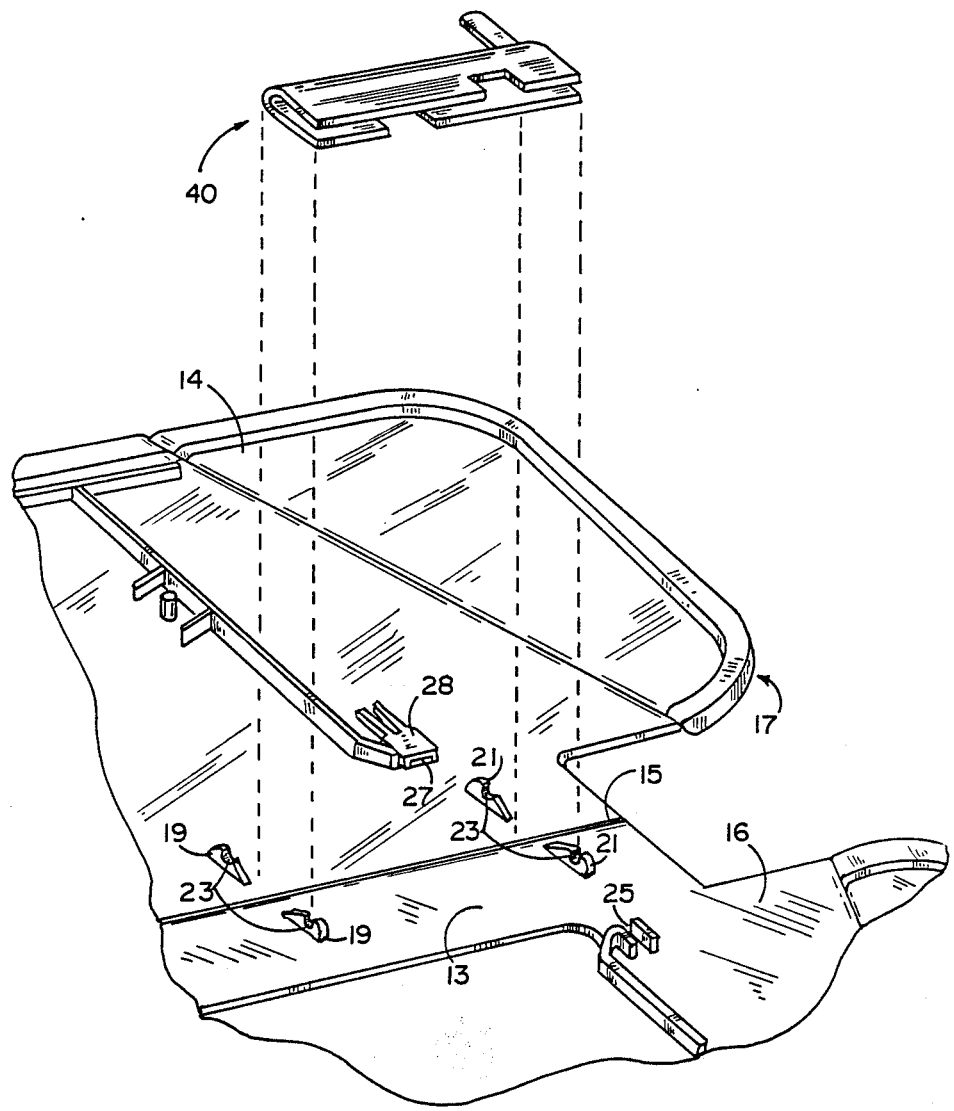
FIG. 9 is an enlarged exploded fragmentary view of a portion of the visor core and torque control.

Core halves 14 and 16 are covered by a suitable upholstery material 11 to conform the visor's appearance to that of the interior of the vehicle. As seen in FIGS. 1 and 9, core halves 14 and 16 generally define a rectangular recess 13 for receiving and holding the generally rectangular body of the visor control 40. Two spaced cradles 19 and 21 on each core half have semicircular pockets 23 to receive and hold the ends of pivot rod 20 which extend into and out of clamp 40. The pivot rod therefore, can rotate with respect to the core halves 14 and 16 and with respect to the captively held visor torque control 40. Core half 16 also includes a generally rectangular recess defining holder 25 (FIG. 9) for circumscribing a portion of tang 50 on the visor control. The tip 52 of tang 50 extends through an aperture 27 formed in an integrally molded rectangular pocket 28 formed in the wall of core half 14 to lockably receive the end 52 of tang 50 within the visor core, and in the preferred embodiment within core half 14. When the core halves 14 and 16 are folded together with control clamp 40 in place, member 25 surrounds and encloses tang 50. Tang 50 thus, holds control 40 to the visor core during assembly and also prevents its rotation during use of the visor. Pocket 28 and member 25 are integrally molded to core halves 14 and 16, respectively to define means for securing the clamp within the visor body formed by core 17.

Figures 2, 3:
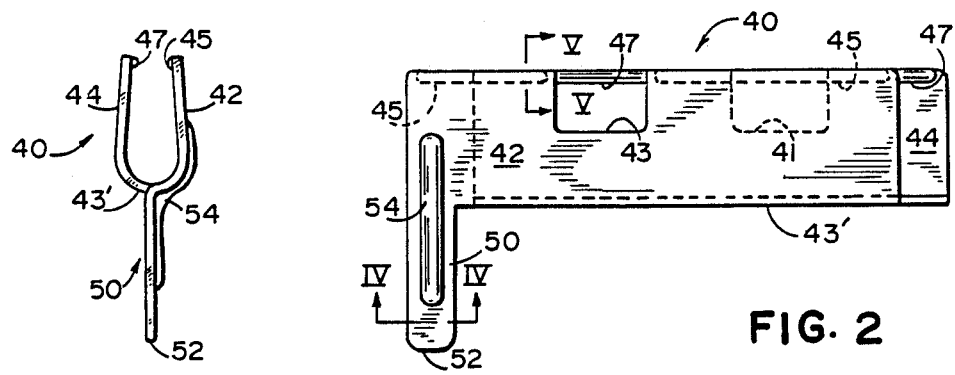
FIG. 2 is an enlarged front elevational view of the visor control shown in the FIG. 1 installation.
FIG. 3 is a left side elevational view of the structure shown in FIG. 2.
Figures 4, 5:
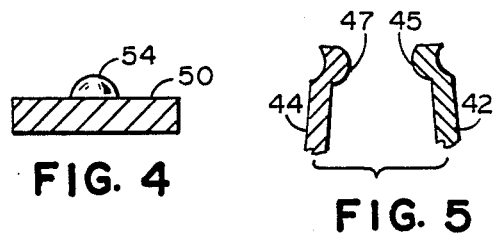
FIG. 4 is an enlarged cross-sectional view taken along section lines IV—IV in FIG. 2.
FIG. 5 is an enlarged fragmentary cross-sectional view taken along section lines V—V in FIG. 2.
Figure 6:
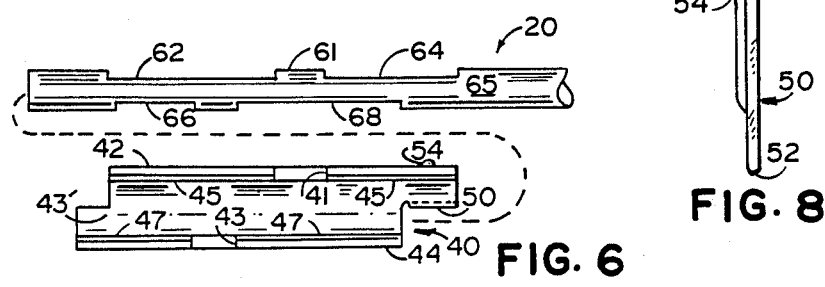
FIG. 6 is an enlarged fragmentary exploded top plan view of the pivot rod and clamp shown in FIG. 1.

The torque control 40 of the present invention comprises a metal clamp which is stamped in the shape illustrated in the drawings from 1074 spring steel having a thickness of approximately 0.965 mm which has a spheroidize surface and is cold rolled and heat treated to meet ASTM A684 standards with a Rockwell hardness of from 42 to 47. The clamp is generally U-shaped in cross-section as best seen in FIG. 3 and includes a first side 42 and a second side or leg 44 integrally joined by the curved base 43′. Sides or legs 42 and 44 converge inwardly at an angle from about 2 to 5 degrees as seen in FIG. 3 and terminate with inwardly projecting tips 45 and 47 which are formed in the sides 42 and 44. As best seen in FIGS. 2 and 6 sides 42 and 44 include notches 41 and 43, respectively for receiving lobes 61 and 63 of pivot rod 20 which are defined by flats 62 and 64 extending on opposite sides of lobe 61 on one side of pivot rod 20 for engaging wall 42 and flats 66 and 68 extending on opposite sides of lobe 63 for engaging side 44 of clamp 40.

Figures 7, 8:
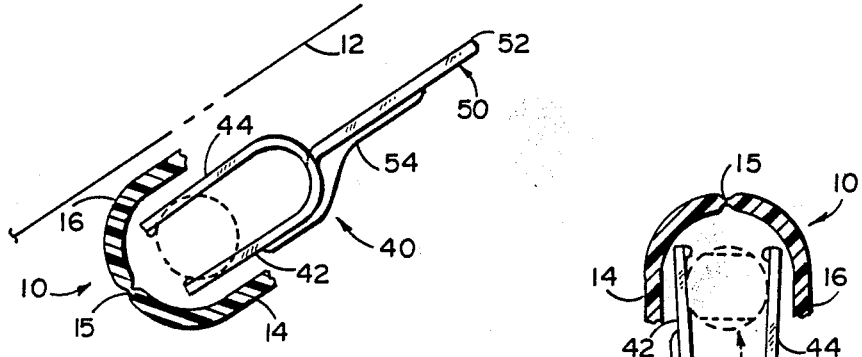
FIG. 7 is a fragmentary end elevational view showing the visor control and a portion of the visor in its raised stored position against the vehicle roof.
FIG. 8 is a fragmentary end elevational view showing the visor in a lowered use position.

In FIG. 6 the visor pivot rod 20 is shown exploded from clamp 40, but aligned in the same position above the clamp as it would be once installed to show the interrelationship and alignment of the lobes and flats on the pivot rod with respect to the notches and sidewalls of the clamp. Thus, the lobes 61 and 63 are alternately staggered along the longitudinal axis of pivot rod 20 while notches 41 and 43 are similarly staggered on side walls 42 and 44 such that sides 42 and 44 fit within and engage flats 62, 64, 66 and 68, respectively when the visor is in a raised stored position as illustrated in FIG. 7. In this position lobe 61 and 63 extend within notches 41 and 43, respectively. As the visor is pivoted away from the stored and snapped-up position, achieved by sides 42 and 44 camming against the edges of the various flats, the rounded portion of the pivot rod 20 deflects the sides 42 and 44 outwardly placing the outer circular diameter 65 of pivot rod 20 in engagement with sides 42 and 44 thereby placing the pivot rod under the clamping pressure of clamp 40 to frictionally hold the visor in a lowered adjusted position as illustrated in FIG. 8. The alternately staggered lobes and flats and associated notches on the clamp operate in this respect in the same manner as disclosed in greater detail in the above identified U.S. Pat. No. 4,500,131 the disclosure of which is incorporated herein by reference.

Extending downwardly from one end of side 42 is tang 50 which is curved inwardly and downwardly as illustrated in FIG. 3 and includes a lower tip 52. A reinforcing indentation 54 is formed longitudinally along tang 50 and extends into the side 42 of clamp 40 as best seen in FIGS. 2 and 3. The tang which extends into the recesses 25 and slot 27 of the visor core 17 prevents rotation of the torque control or clamp 40 within the visor body as the visor is rotated about rod 20.

The inwardly projecting sides 42 and 44 of clamp 40 with their rounded and inwardly projecting tips 45 and 47, respectively captively hold the clamp in position with respect to pivot rod 20 as does the visor core which captively holds the clamp in position. The visor pivot rod 20 in turn is held in position with respect to the clamp and visor by the cradles 19 and 21 spaced on opposite sides of the clamp 40. The rotational torque of pivot rod 20 within the clamp 40 when the visor is moved from a position shown in FIG. 7 to that shown in FIG. 8 can be from approximately ½ to 6 inch-pounds depending on the visor size and can be varied by varying the pivot rod diameter.

During manufacture the visor pivot rod 20 is snapped in the open end of the U-shaped clamp 40 downwardly between legs 42 and 44 with the lobes 61 and 63 in alignment with notches 41 and 43 which process is faster and easier than axially sliding the pivot rod through end walls of prior art clamps. The preassembled visor pivot rod 20 and its mounting bracket (not shown) for the vehicle is then positioned in the recess 13 of the visor with end 52 of tang 50 extending through aperture 27 of pocket 28. The core halves 14 and 16 can then be snapped together when constructed as taught in copending U.S. patent application entitled VISOR; Ser. No. 058,996; filed on June 8, 1987.

It will become apparent to those skilled in the art the various modifications to the preferred embodiment of the invention which can be made without departing from the spirit or scope of the invention as defined by the appended claims.

The embodiments of the invention in which an seclusive property or privilege is claimed are defined as follows:

1. A visor and control for controlling the position of a visor with respect to a pivot rod which includes flats formed thereon, said visor and control comprising:
    a U-shaped clamp having sidewalls which converge inwardly and terminate in inwardly projecting longitudinally extending rounded tips to circumscribe at least a portion of a visor rod when inserted therein and for holding the visor rod between said sides of said U-shaped clamp for different rotational positions of said clamp with respect to the visor rod; and clamp including a tang extending from at least one of said sides; and
    a folded visor core including a pocket formed therein for receiving and holding said tang to prevent movement of said clamp with respect to said visor core, said visor core defining the shape of said visor and covered by an upholstery material.

2. The apparatus as defined in claim 1 wherein said means for securing said clamp within the body of a visor includes a tang extending outwardly from at least one of said sides and adapted to fit within a recess formed in a visor body.

3. The apparatus as defined in claim 2 wherein said tang includes a reinforcing indentation extending across the junction of said tang and said one side.

4. The apparatus as defined in claim 3 wherein each of said sides includes notch means formed therein in alternately staggered relationship along the longitudinal axis of said clamp and selectively aligned with lobes on a pivot rod when the visor is in a raised stored position.

5. The apparatus as defined in claim 4 wherein said tang extends outwardly from an end of one of said sides.

6. The apparatus as defined in claim 5 wherein said tang is integral with said one side.

7. The apparatus as defined in claim 6 wherein said clamp is integrally formed of spring steel.

8. A visor and control for controlling the position of said visor with respect to a pivot rod comprising:
    a visor pivot rod;
    a U-shaped clamp having sidewalls which converge inwardly and terminate in rounded tips to circumscribe at least a portion of said visor rod when inserted therein said sides holding said visor rod there between for different rotational positions of said clamp with respect to said visor rod; and
    a visor body including recess means for receiving and holding said U-shaped clamp, said body further including means for receiving said pivot rod, and wherein said clamp includes means for securing said clamp within said body of a visor including a tang extending outwardly from at least one of said sides and adapted to fit within said recess means formed in said visor body wherein said recess means for receiving and holding said clamp includes a visor core including pocket means surrounding a portion of said tang and an aperture through which said tang extends, and wherein said core comprises a folded polymeric core and wherein said pocket and aperture are formed in one half of said core.

9. The apparatus as defined in claim 8 wherein said core includes a tang receiving recess on the other half of said core.

10. The apparatus as defined in claim 9 wherein said tang receiving recess is defined by a member which encloses said tang when said core halves are folded together.

11. The apparatus as defined in claim 10 wherein said tang includes a reinforcing indentation extending across the junction of said tang and said one side.

12. The apparatus as defined in claim 11 wherein each of said sides includes notch means formed therein in alternately staggered relationship along the longitudinal axis of said clamp and said pivot rod includes alternately staggered flats and lobes formed thereon with said lobes on said pivot rod extending within said notch means when said visor is in a raised stored position.

13. The apparatus as defined in claim 12 wherein said tang extends outwardly from an end of one of said sides.

14. The apparatus as defined in claim 13 wherein said tang is integral with said side.

15. The apparatus as defined in claim 14 wherein said clamp is integrally formed of spring steel.

* * * * *

UNITED STATES PATENT AND TRADEMARK OFFICE
CERTIFICATE OF CORRECTION

PATENT NO. : 4,828,313

DATED : 5/9/89

INVENTOR(S) : M. Lanser, T. VandenBerge

It is certified that error appears in the above-identified patent and that said Letters Patent is hereby corrected as shown below:

Column 4, line 23, claim 1,

After "rod;" delete --and-- insert --said--

Signed and Sealed this

Eighteenth Day of September, 1990

Attest:

HARRY F. MANBECK, JR.

*Attesting Officer*   *Commissioner of Patents and Trademarks*